US012810423B2

(12) United States Patent
Le Berre et al.

(10) Patent No.: US 12,810,423 B2
(45) Date of Patent: Nov. 24, 2026

(54) DEVICE FOR PROCESSING REAL-TIME PCR MEASUREMENTS WITH A HOMOGENEOUS REACTION MEDIUM IN WHICH THE PCR REAGENTS CAN DIFFUSE

(71) Applicant: BFORCURE, Montreuil (FR)

(72) Inventors: Maël Le Berre, Montreuil (FR); Francesco Villa, Montreuil (FR); Stéphane Poirier, Montreuil (FR)

(73) Assignee: BFORCURE, Montreuil (FR)

( * ) Notice: Subject to any disclaimer, the term of this patent is extended or adjusted under 35 U.S.C. 154(b) by 168 days.

(21) Appl. No.: 18/870,085

(22) PCT Filed: May 26, 2023

(86) PCT No.: PCT/FR2023/050743
§ 371 (c)(1),
(2) Date: Nov. 27, 2024

(87) PCT Pub. No.: WO2023/227851
PCT Pub. Date: Nov. 30, 2023

(65) Prior Publication Data
US 2026/0253207 A1 Aug. 27, 2026

(30) Foreign Application Priority Data
May 27, 2022 (FR) ...................................... 2205101

(51) Int. Cl.
*B01L 3/00* (2006.01)
*B01L 7/00* (2006.01)
(Continued)

(52) U.S. Cl.
CPC .............. *G06T 7/0012* (2013.01); *G06T 7/11* (2017.01); *G06T 7/136* (2017.01);
(Continued)

(58) Field of Classification Search
CPC ..... B01L 2300/0816; B01L 2300/0864; B01L 2300/185; B01L 2400/0655;
(Continued)

(56) References Cited

U.S. PATENT DOCUMENTS

| | | | |
|---|---|---|---|
| 3,595,801 | A | 7/1971 | Rosch |
| 10,846,868 | B1 | 11/2020 | Wang |

(Continued)

FOREIGN PATENT DOCUMENTS

| | | | |
|---|---|---|---|
| EP | 1992682 | A1 | 11/2008 |
| FR | 1601823 | A | 9/1970 |
| FR | 3074810 | A1 | 6/2019 |

OTHER PUBLICATIONS

Hindson et al. "High-Throughput Droplet Digital PCR System for Absolute Quantitation of DNA Copy Number", Analytical Chemistry 2011 83(22), 8604-8610), 7 pages.

(Continued)

*Primary Examiner* — Michael J Vanchy, Jr.
(74) *Attorney, Agent, or Firm* — Boone IP Law

(57) ABSTRACT

A device includes a memory receiving fluorescence images obtained by filming a real-time PCR reaction in a flat chamber, and an analyzer producing a PCR activity image from the fluorescence images with a homogeneous reaction medium in which PCR reagents can diffuse. The PCR activity image having activity regions in each of which PCR activity is determined as likely based on the fluorescence value of the pixels of these activity regions in the fluorescence images, the pixels of the activity regions each receiving a weighting value. The device further includes an evaluator analyzing the fluorescence images by weighting in each image the fluorescence value of each pixel by the weighting value of that pixel in the activity image, and returning a value indicating whether the filmed real-time (Continued)

PCR reaction exhibits PCR amplification, a threshold cycle value, and a concentration curve during the PCR reaction.

16 Claims, 5 Drawing Sheets

(51) Int. Cl.
*F28F 3/12* (2006.01)
*G06T 7/00* (2017.01)
*G06T 7/11* (2017.01)
*G06T 7/136* (2017.01)

(52) U.S. Cl.
CPC ............... *G06T 2207/10016* (2013.01); *G06T 2207/10064* (2013.01); *G06T 2207/20084* (2013.01)

(58) Field of Classification Search
CPC ......... B01L 3/502707; B01L 3/502715; B01L 7/52; F28F 2260/02; F28F 3/12; C12Q 1/6844; C12Q 1/686; C12Q 2523/313; C12Q 2527/125; C12Q 2527/156; C12Q 2547/107
See application file for complete search history.

(56) References Cited

U.S. PATENT DOCUMENTS

2012/0088691 A1 4/2012 Chen
2019/0388887 A1* 12/2019 Le Berre ........... B01L 3/502715

OTHER PUBLICATIONS

He et al. "Mask R-CNN", arXiv: 1703.06870, accessed from https://doi.org/10.48550/arXiv.1703.06870 on Feb. 20, 2025, 12 pages.
"Understanding ResNet50 architecture", accessed from https://web.archive.org/web/20211227064145/https://iq.opengenus.org/resnet50-architecture/ on Feb. 20, 2025, 8 pages.
Ronneberger et al. "U-Net: Convolutional Networks for Biomedical Image Segmentation", Medical Image Computing and Computer-Assisted Intervention (MICCAI) LNCS 9351, pp. 234-241 (2015), https://arxiv.org/pdf/1505.04597.pdf, 8 pages.
Yu et al. "Automatic thresholding metod for high-throughput digital polymerase chain reaction fluorescence images with uneven illumination", Xiamen University of Technology 2022, vol. 31, 20 pages.
International Search Report (PCT/ISA/210), mailed on Nov. 21, 2023, by the European Patent Office as the International Searching Authority for International Application No. (PCT/FR2023/050743) (6 pages).
Written Opinion dated Jul. 21, 2023, by the European Patent Office as the International Searching Authority for International Application No. (PCT/FR2023/050743) (6 pages).
Beini Zhang et al: "A New Few-Shot Learning Method of Digital PCR Image Detection", IEEE Acess, IEEE, USA, vol. 9, May 17, 2024, pp. 74446-74453, XP01185689, DOI: 10.1109/ACESS.2021.3081562.
Higuchi R. et al: "Kinetic PCR Analysis: Real-time monitoring of DNA amplification reactions", Biotechnology. The International Monthly for Industrial Biology, Nature publishing group, US, vol. 11, No. 9, Sep. 1993, pp. 1026-1030, XP000197685, ISSN: 0733-222x, DOI: 10.1038/NBT0993-1026.

* cited by examiner

[Fig.1]
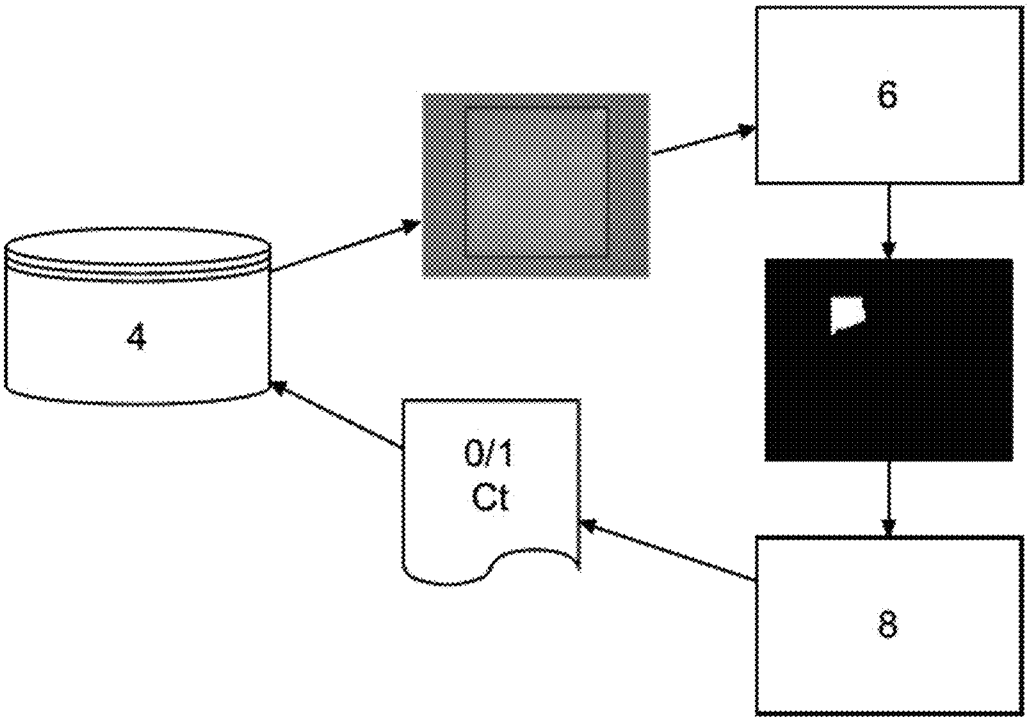
[Fig.2]
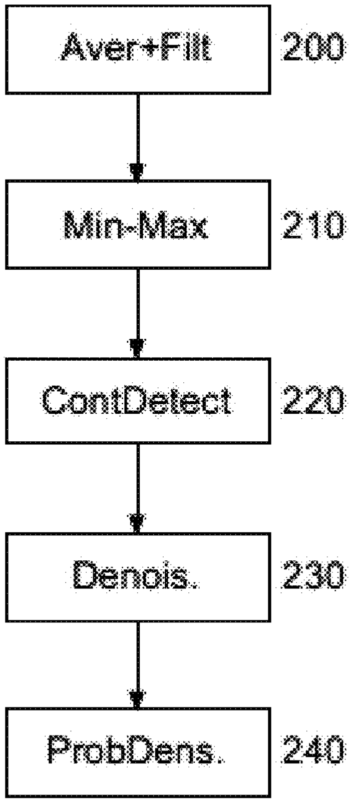

[Fig.3]
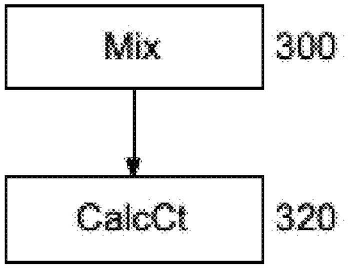
[Fig.4]
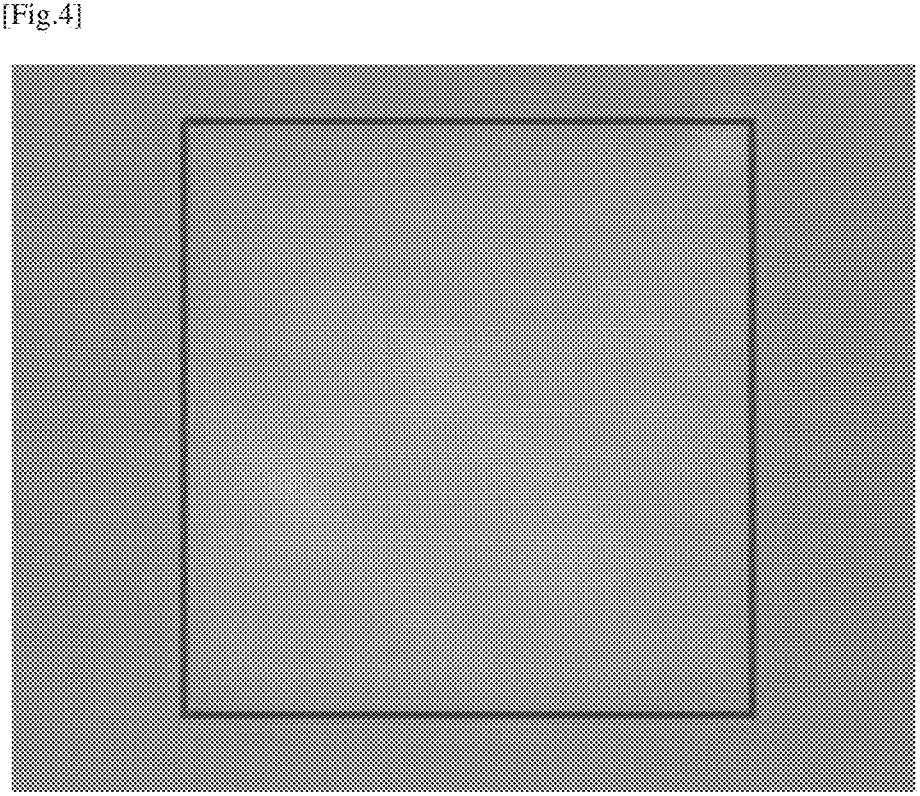

[Fig.5]
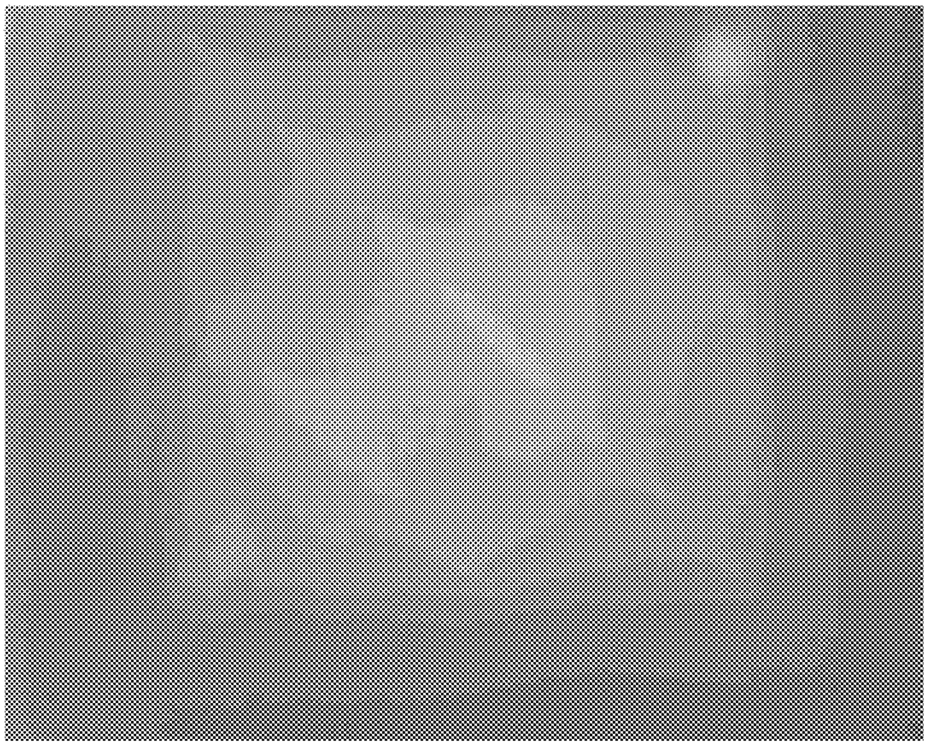
[Fig.6]
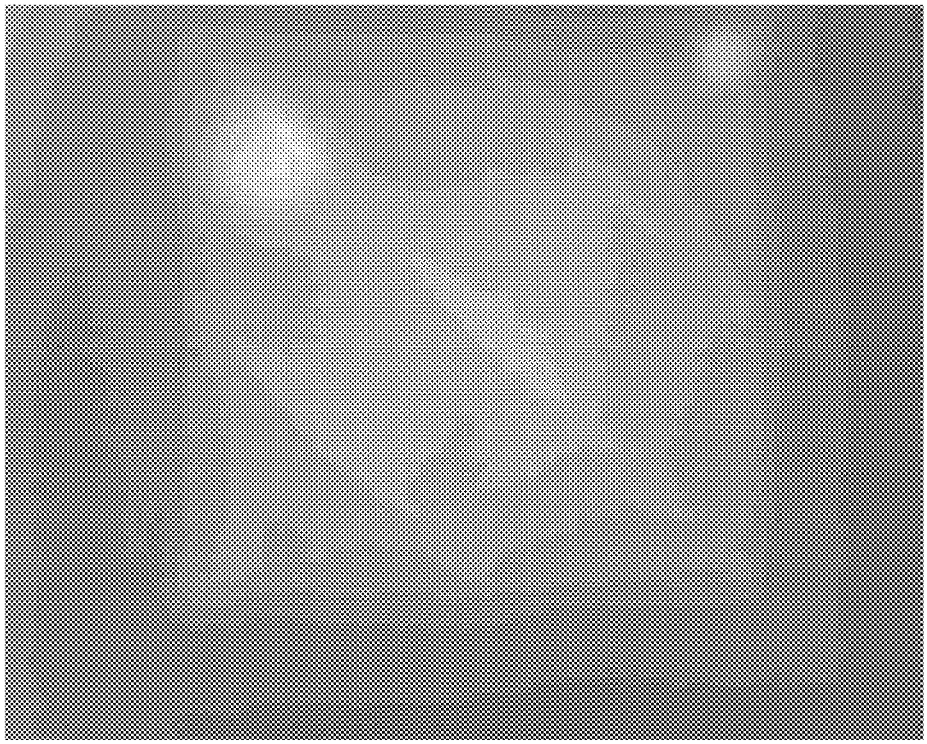

[Fig.7]
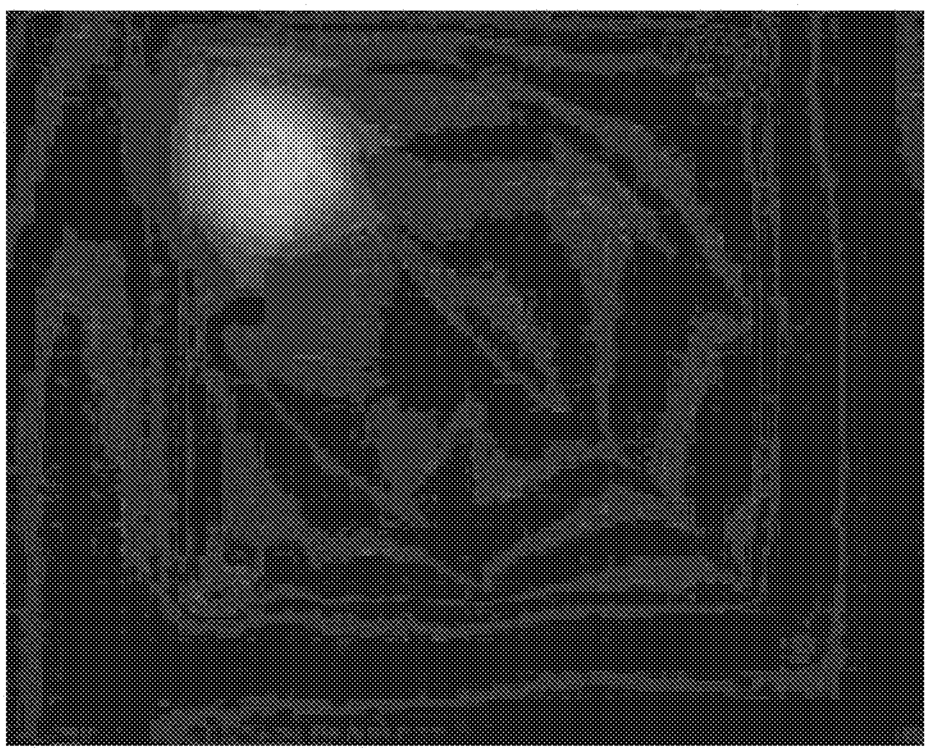
[Fig.8]

[Fig.9]
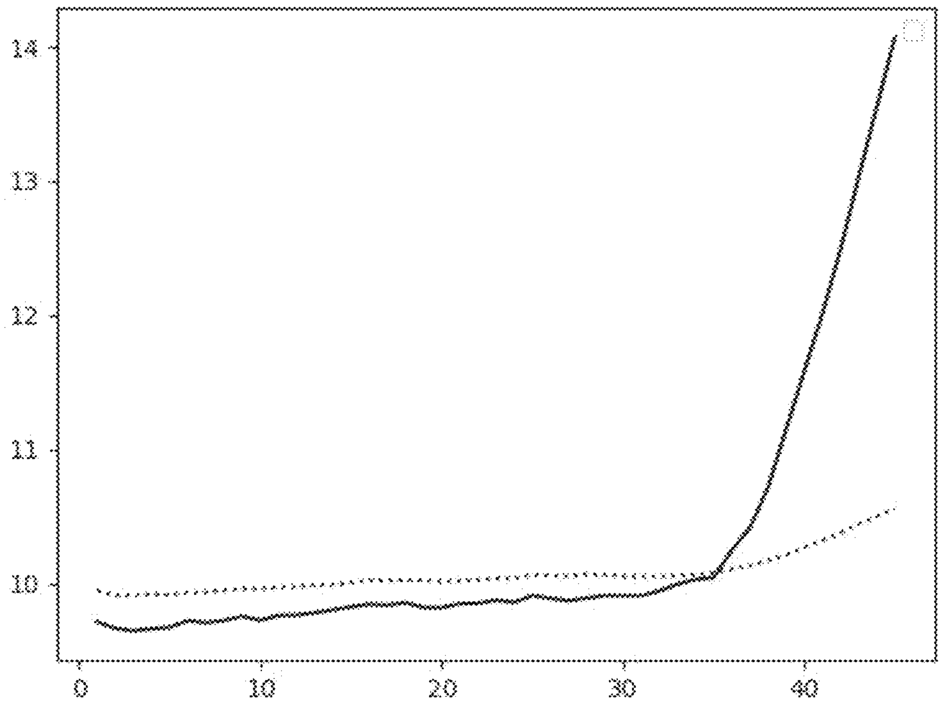
[Fig.10]
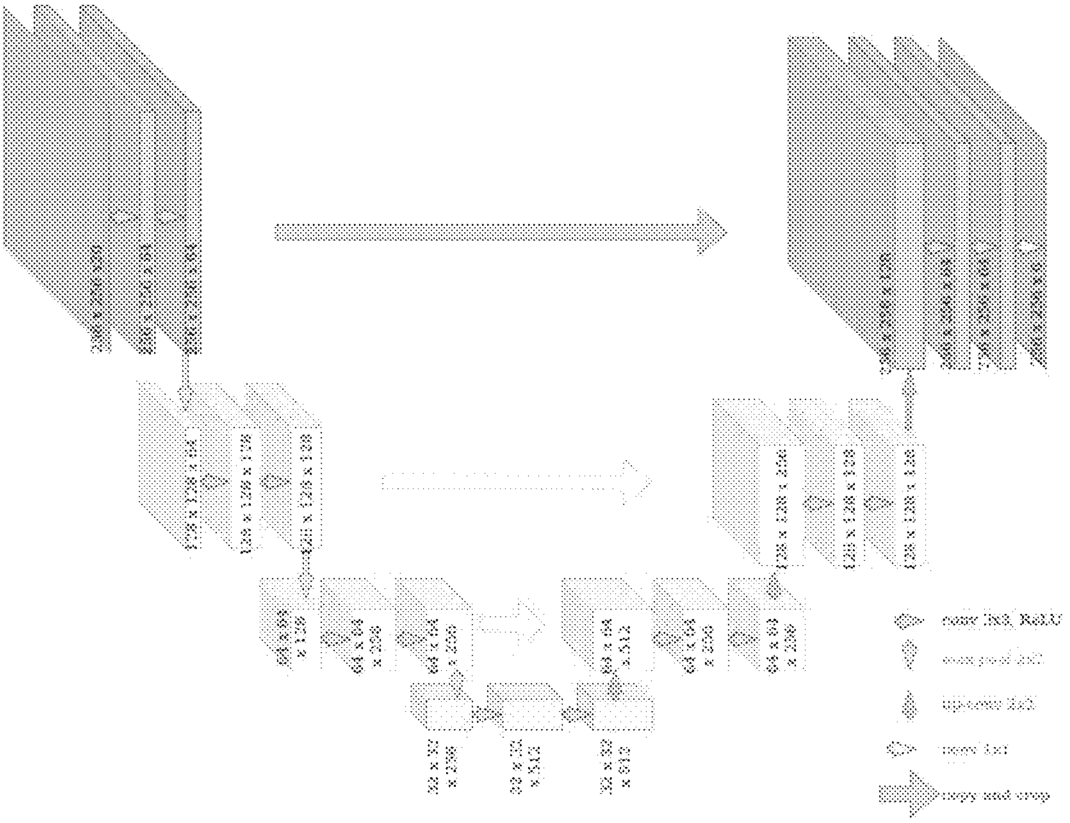

DEVICE FOR PROCESSING REAL-TIME PCR MEASUREMENTS WITH A HOMOGENEOUS REACTION MEDIUM IN WHICH THE PCR REAGENTS CAN DIFFUSE

The invention relates to the field of real-time PCR ("Polymerase Chain Reaction").

The PCR allows detecting in a very sensitive manner the presence of nucleic acid sequences in a sample. Nevertheless, it is barely used for field applications because the reaction—about 1 h30—is relatively slow.

Indeed, amplification by PCR is carried out with cycles whose temperature profile comprises one or more level(s) when the temperature rises towards the melting temperature close to 95° C. The temperature levels are selected between the melting temperatures of the probes, and the fluorescence signal is recorded at each of these levels. Hence, the speed of the reaction is limited by the duration of each cycle which is directly related to the speed of the temperature changes in the reaction chamber.

To overcome this problem, very fast "micro-heater" (about 20 minutes for 40 cycles) have been developed. However, the treated volume is very small (about 10 μl) which limits the LOD (standing for "Limit of detection" or detection threshold), and therefore the ability to detect small amounts of nucleic acid.

Drop PCR systems (cf. for example the article by Hindson et al. "High-Throughput Droplet Digital PCR System for Absolute Quantitation of DNA Copy Number", Analytical Chemistry 2011 83(22), 8604-8610) have been developed, but they have the drawback that the temperature is not homogeneous in the reaction chamber and that they are complicate to implement.

In these digital PCR systems, the PCR is compartmentalised into regions with a definite shape (the drops) such that the PCR signal is digitised to enable the quantification of the target DNAs individually by counting the drops producing a positive PCR. This quantification is carried out by segmentation of the image of the drops at the end of the reaction to determine their position and from this position individually measuring their fluorescence level to determine whether the content of the drop is PCR positive or not. The algorithms used to analyse the digital PCR images like the drop PCR measure the activity of the PCR reaction in a predefined region.

These algorithms are not suited to the analysis of the activity of a PCR carried out in a homogeneous medium such as a liquid or a gel where the activity of the PCR could take place in a region whose size and shape is not defined a priori and could potentially change over time because of the diffusion of the products of the PCR reaction in the medium. Because of these specificities, the domain of digital PCR remains an isolated domain, and its teachings are not used in other fields of PCR.

The Applicant has developed a solution to address these problems, which solution has been the object of patent applications FR1601823 and FR1762058. These patent applications teach the use of chambers that have the characteristic of using flat chips enabling a homogeneous heat exchange over the entire surface and with a small thickness so that the temperature variations are fast over the entire volume.

However, these solutions tend to limit convection movements within the reagent volume. The local amplifications do not propagate, in particular in case of a low concentration of the DNA looked for. The local signal is then attenuated by that of the entire chip, which limits the sensitivity of the PCR tests carried out on these chips.

These solutions have a homogeneous reaction medium in which the PCR reagents can diffuse, as opposed to the aforementioned digital PCR. By "homogeneous medium", it should be understood a liquid reagent or a gel in which the PCR reaction can diffuse freely and thus form activity regions with an indeterminate shape. This means that the regions in which the amplification takes place have an indeterminate shape, unlike the drops whose shape is known.

Hence, no solution of the prior art allows carrying out real-time PCRs that are very fast and at the same time with a single molecule sensitivity.

The invention improves the situation. To this end, it provides a device for processing real-time PCR measurements with a homogeneous reaction medium in which the PCR reagents can diffuse comprising a memory arranged to receive a plurality of fluorescence images obtained by filming a real-time PCR reaction in a flat chamber, an analyser arranged to produce a PCR activity image from the plurality of fluorescence images obtained by filming a real-time PCR reaction in a flat chamber with a homogeneous reaction medium in which the PCR reagents can diffuse, which PCR activity image has a plurality of activity regions in each of which PCR activity is determined as likely on the basis of the fluorescence value of the pixels of these activity regions in the plurality of fluorescence images obtained by filming a real-time PCR reaction in a flat chamber, each of the pixels of the activity regions receiving a weighting value associated with the likelihood of a PCR reaction such that the sum of all weighting values is one, and the pixels outside the activity regions receiving a zero value, and an evaluator arranged to analyse the plurality of fluorescence images obtained by filming a real-time PCR reaction in a flat chamber by weighting in each image the fluorescence value of each pixel by the weighting value of that pixel in the activity image, and to return one or more among a value indicating whether the filmed real-time PCR reaction exhibits PCR amplification, a threshold cycle value, and a concentration curve during the PCR reaction.

This device is particularly advantageous because it allows detecting the PCR activity regions and therefore reprocessing the fluorescence signal without being affected by the absence of propagation of local amplifications due to the limitations of the convection movements within the reagent volume.

According to various embodiments, the invention may have one or more of the following features:

- the analyser is arranged to determine an image of differences from the plurality of fluorescence images obtained by filming a real-time PCR reaction in a flat chamber, in which each pixel corresponds to the difference between the highest value and the lowest value for that pixel among the plurality of fluorescence images obtained by filming a real-time PCR reaction in a flat chamber, and to determine the activity image from the difference image,
- the analyser is arranged to determine activity regions in the image of the differences by thresholding the image of the differences,
- the analyser is arranged to determine a unique weighting value for each of the pixels of the PCR activity image,
- the analyser is arranged to determine the weighting value by applying an Otsu, Bernsen, or Niblack fixed-threshold binarisation function, the analyser is arranged to apply a binarisation function comprising regularising the activity regions by applying expansion, erosion, or convex envelopes, the analyser is arranged to apply a binarisation function in which the expansion of the activity regions is obtained by adding a pixel around each area activity region until the sum of the surface areas of the activity regions exceeds a selected threshold, or to apply a binarisation function in which erosion of the activity regions comprises removing the activity regions whose number of pixels is lower than a selected threshold, the analyser is arranged to determine the weighting value by dividing the value of each pixel belonging to an activity region by the sum of all pixel values of all activity regions, the analyser is an R-CNN mask type or U-Net type neural network carrying out a semantic segmentation of the pixels from the plurality of fluorescence images obtained by filming a real-time PCR reaction in a flat chamber, and the evaluator is arranged to determine a threshold cycle value for each activity regio, and to calculate a threshold cycle value according to the formula $C_t=\log_2(S_t/\Sigma_i S_i x 2^{-Ct_i})$, (where $S_t$ is the total surface area of the activity regions, $S_i$ is the surface area of each activity region, and $Ct_i$ is the threshold cycle value of the activity region of index i.

The invention also relates to a method for processing real-time PCR measurements with a homogeneous reaction medium in which the PCR reagents can diffuse comprising:

a) receiving a plurality of fluorescence images obtained by filming a real-time PCR reaction in a flat chamber with a homogeneous reaction medium in which the PCR reagents can diffuse, b) producing a PCR activity image from the plurality of fluorescence images obtained by filming a real-time PCR reaction in a flat chamber, which PCR activity image has a plurality of activity regions in each of which PCR activity is determined to be likely on the basis of the fluorescence value of the pixels of these activity regions in the plurality of fluorescence images obtained by filming a real-time PCR reaction in a flat chamber, each of the pixels of the activity regions receiving a weighting value associated with the likelihood of a PCR reaction such that the sum of all values is one, and the pixels outside the activity regions receiving a zero value, c) analysing the plurality of fluorescence images obtained by filming a real-time PCR reaction in a flat chamber by weighting in each image the fluorescence value of each pixel by the weighting value of that pixel in the activity image, and to return one or more among a value indicating whether the filmed real-time PCR reaction exhibits PCR amplification, a threshold cycle value, and a concentration curve during the PCR reaction.

According to various embodiments, the method may have one or more of the following features:

the operation b) comprises b1) determining an image of differences from the plurality of fluorescence images obtained by filming a real-time PCR reaction in a flat chamber, in which each pixel corresponds to the difference between the highest value and the lowest value for this pixel among the plurality of fluorescence images obtained by filming a real-time PCR reaction in a flat chamber, and b2) determining the activity image from the difference image, the operation b) comprises determining a unique weighting value for each of the pixels of the PCR activity image, or determining the weighting value by dividing the value of each pixel belonging to an activity region by the sum of all pixel values of all activity regions, the operation b) is obtained by applying an R-CNN mask type or U-Net type neural network carrying out a semantic segmentation of the pixels from at least some of the images of the operation a), and the operation c) comprises determining a threshold cycle value for each activity region, and calculating a threshold cycle value according to the formula $C_t=\log_2(S_t/\Sigma_i S_i x 2^{-Ct_i})$, where $S_t$ is the total surface area of the activity regions, $S_i$ is the surface area of each activity region, and $Ct_i$ is the threshold cycle value of the activity region of index i.

The invention also relates to a computer program comprising instructions for executing the method according to the invention, a data storage medium on which such a computer program is recorded and a computer system comprising a processor coupled to a memory, the memory having recorded such a computer program.

Other features and advantages of the invention will appear more clearly on reading the following description, taken from examples given as a non-limiting illustration, from the drawings wherein:

FIG. 1 shows a generic diagram of a device according to the invention,

FIG. 2 shows an embodiment of a function implemented by the analyser of FIG. 1, FIG. 3 shows an embodiment of a function implemented by the evaluator of FIG. 1, FIG. 4 shows a fluorescence image obtained by filming a real-time PCR reaction in a flat chamber, FIG. 5 shows an intermediate image of the cycle 10 determined by the analyser of FIG. 1, FIG. 6 shows an intermediate image of the cycle 41 determined by the analyser of FIG. 1, FIG. 7 shows an image of differences obtained from the intermediate images of the type like those of FIGS. 5 and 6, FIG. 8 shows a result image obtained by the evaluator of FIG. 1 from the image of FIG. 7, FIG. 9 shows an amplification signal obtained by combining the image of FIG. 8 with the images of the corresponding film, and FIG. 10 shows a U-Net neural network architecture according to one of the variants of the invention.

The drawings and the description hereinafter essentially contain elements of a certain character. They could therefore not only be used to better understand the present invention, but also contribute to the definition thereof, where appropriate.

[FIG. 1] shows a generic diagram of a device according to the invention.

The device 2 comprises a memory 4, an analyser 6 and an evaluator 8.

The memory 4 receives several data types. Thus, it receives fluorescence images obtained by filming a real-time PCR reaction in a flat chamber with a homogeneous reaction medium in which the PCR reagents can diffuse. Considered together, these images represent the film of the fluorescence emitted following the implemented PCR cycles. By homogeneous medium, it should be understood a liquid reagent or a gel where the PCR reaction can diffuse freely and thus form activity regions with an indeterminate shape. This means that the regions in which the amplification takes place have an indeterminate shape, for which reason the fluorescence is conventionally averaged over the entire chamber to measure the reaction.

In the example described herein, there are about 45 cycles in each real-time PCR reaction, and 45 corresponding images, each associated with a PCR cycle of the reaction. Alternatively, there could be another number of cycles in each reaction, and several images could be associated with the same cycle within a given real-time PCR reaction, which allows storing richer data on the PCR reaction in each cycle. Next, by film, reference will be made all of the images of the PCR cycles of a given real-time PCR reaction, and when talking about comparing two images with one another, it is implicit that these will be images relating to the same real-time PCR reaction.

The analyser 6 processes the films to produce, for each film, a PCR activity image in which each pixel has a colour associated with a value (between zero and one) which indicates a likelihood that a PCR reaction has been detected for this pixel. Alternatively, the value and the colour could not be related. The set of values of the pixels has a sum that is equal to one, such that the values of the pixels together define a likelihood density. This point will be explained hereinbelow. This PCR activity image may be obtained in various ways which will be described later on, among which the evaluator 6 produces an image of differences, which corresponds to the difference between an average of images associated with a high PCR activity and an average of images associated with a low PCR activity. Herein again, this will be explained hereafter.

All these images can be stored in the memory 4.

Finally, the memory 4 also receives real-time PCR reaction data, which could indicate whether a nucleic acid sequence has been detected and/or specify a cycle from which the real-time PCR reaction is considered to have revealed such detection. This last value is also known under the reference "Ct" in the field of real-time PCR. In general, the value Ct is an indicator of the amount of the desired nucleic sequence that has been detected. Indeed, the more materials to be detected in a sample, and the more the PCR reaction will produce a large amount of detected materials from a cycle whose index is low (i.e. close at the beginning of the reaction). Thus, a Ct of 15 indicates that there were much more materials of the desired nucleic acid sequence in a given sample than a Ct of 30.

The memory 4 may be any data storage type capable of receiving digital data: hard disk, flash memory hard disk, flash memory in any form, random-access memory, magnetic disk, storage distributed locally or in the cloud, etc. The data calculated by the device may be stored on any type of memory similar to the memory 4, or on the latter. These data may be erased after the device has performed its tasks or kept.

The invention is based on the principle described hereinafter. Because of the limitations of convection movements within the reagent volume in the flat chamber, some portions of the chamber do not have any reaction while they should. Therefore, the fluorescence signal, which is averaged over the entire surface of the flat chamber, is artificially lowered, which reduces the LOD.

The device 2 allows overcoming this problem by analysing all of the images of a given film, and by deriving an image on which the detection of a PCR reaction is encoded via a likelihood density. This then allows reprocessing the film while taking account of this likelihood density to carry out the detection. Thus, only the portions of the flat chamber that are relevant are taken into account, and the likelihood density allows normalising the relative contribution of each portion to the final result.

For this purpose, the analyser 6 processes a given film to derive therefrom a PCR activity image in which each of the pixels of a plurality of activity regions in each of which a PCR activity is determined as likely receives a weighting value associated with the likelihood of a PCR reaction such that the sum of all of the weighting values is one, and the pixels outside the activity regions receive a zero value.

Afterwards, the evaluator 8 uses the PCR activity image and combines the weighting values with the given film in order to analyse the relevant regions of the images in order to derive information on the detection of a nucleic acid sequence and/or a Ct type value.

The analyser 6 and the evaluator 8 directly or indirectly access the memory 4. They may be made in the form of an appropriate computer code executed on one or more processor(s). By processors, it should be understood any processor adapted to the calculations described hereinbelow. Such a processor may be made in any known manner, in the form of a microprocessor for a personal computer, laptop, tablet or smartphone, an FPGA or SoC type dedicated chip, a computing resource on a grid or in the cloud, a cluster of graphics processors (GPUs), a microcontroller, or any other form capable of providing the computing power necessary for the embodiment described hereinbelow. One or more of these elements may also be made in the form of specialised electronic circuits such as an ASIC. A combination of a processor and electronic circuits may also be considered. In the case of the machine learning unit based on gradient reinforcement, processors dedicated to machine learning may also be considered.

Hence, the analyser 6 is intended to determine regions of interest in the images of a given film, and to qualify these regions of interest to render them in the form of a likelihood density.

To implement the analyser 6, several solutions are available:

- use of an image of the differences between the fluorescences according to the different cycles,
- use of deep neural networks dedicated to the segmentation of objects in the R-CNN mask type images (described herein below), and
- use of semantic segmentation neural networks directly giving an image of the classes looked for. In the example described herein, these classes may comprise an active PCR region, an inactive PCR region, outside the flat chamber, supply hole, bubbles, high-luminosity points.

Indeed, apart from the PCR regions that are active or inactive because of the convection limits, some artifacts might disturb the fluorescence images. Thus, the camera used to film the reaction has a larger field than the flat chamber, and therefore there is a region that is not relevant by definition. In addition, anomalies are regularly noticed at the level of the hole that is used to introduce the elements of the reaction into the flat chamber. Similarly, some imperfections of the flat chamber induce high-luminosity points. Finally, bubbles might form during the reaction. The bubbles are the most troublesome artifact, because they are not stable during the PCR reaction, and their boundary is often brighter than the rest of the sample.

The first solution requires a separate processing for each class other than the active PCR region in order to discard the corresponding regions.

The second and third solutions have the advantage of being direct, but the neural networks are always difficult to make effective without overfit.

[FIG. 2] shows an example of a function implemented by the analyser 6 which uses the first solution.

In the context of the first solution, the analyser 6 operates in four main steps comparing the images of a given film to create a maximum difference fluorescence image, filtering this image to determine the regions of interest, processing the filtered image to compensate for the edge effects and to eliminate the artifacts, and modifying the resulting image to produce a likelihood density with the remaining regions of interest.

Thus, in a first operation 200, the images of a given film are processed to create the maximum difference fluorescence image. [FIG. 4] shows an example of the film images received as input. When several images are available for the same cycle of a given film, an average of images captured during the cold phase of each cycle is used to produce an image representative of each cycle. This allows limiting the acquisition noise of the camera, and is preferably done with the images corresponding to the cold phase of the cycle, which is known to have a more stable fluorescence. The exact number of images to calculate the average as well as the exact period of the cycle where they are derived could be parameterised or set. The completion of several experiments could allow calibrating the device 2 to this end. FIGS. 5 and 6 show examples of these images for the cycles 10 and 41 respectively.

Afterwards, in an operation 210, a maximum fluorescence image and a minimum fluorescence image are generated. As regards the maximum fluorescence image, the images resulting from the operation 200 associated with the cycles of index 25 to 45 are combined so that, for each pixel, it is the fluorescence value among the 20 images which is retained. Similarly, the minimum fluorescence image is obtained by retaining, for each pixel, the minimum fluorescence in the images derived from the operation 200 corresponding to the cycles 5 to 15. Of course, the index ranges for determining the maximum fluorescence image and the minimum fluorescence image may vary, both with regards to their ends and their width. Once these two images have been calculated, their difference is made, and represents for each pixel the maximum fluorescence difference during the most relevant cycles. [FIG. 7] shows an image of differences obtained at the output of the operation 220.

This image of the differences is processed in an operation 220 in order to determine the contours of the regions of interest. For example, this may be carried out by thresholding with two fluorescence measurement units. Alternatively, the threshold may be modified. In addition, alternative methods could be used to select the regions of interest, like a Niblack type or Bernsen type method.

The thresholded image of the operation 220 is then processed in an operation 230 to remove artifacts. As explained hereinabove, this processing may comprise the suppression of the regions that are outside the flat chamber, the detection of the high-luminosity points and of the introduction region of the flat chamber, as well as the removal of the bubbles. As regards the introduction region of the flat chamber, the latter may be determined empirically by carrying out several calibration cycles or be subjected to an adhoc detection.

In turn, the bubbles are determined by detection in the images of the film before processing by the analyser 6. For this purpose, the images are processed by increasing cycle index, and each pixel is qualified in each image as belonging to a bubble or not. When a pixel is qualified in any image as belonging to a bubble, it is added to a list of bubble pixels.

The detection of belonging to a bubble may be carried out by applying an algorithm in which, for a given image:

a Canny filter is applied in order to determine the boundaries of objects, appended components induced by the boundaries found are created—the presence of bubbles is detected by boundaries surrounding them, and a closed boundary (forming a loop) determines two different appended components, each appended component is considered to be a bubble if its average grey level is below a threshold dynamically determined with respect to the fluorescence unit values of the flat chamber, and the appended component is expanded so that the bubble region contains the edge.

Thus, the pixels of the list of bubble pixels are suppressed, like the other artifacts. Alternatively, the list of bubble pixels could be determined during the operation 200 or 210.

Hence, upon completion of this operation, the image of the differences comprises pixels whose value is non-zero, which represent the regions of interest, and all of the other pixels have a zero value.

Finally, the processed image derived from the operation 230 is modified in an operation 240 in order to construct the likelihood density. For this purpose, the values of the image of the differences may be processed in two ways:

creation of a variable likelihood density, by dividing, for each pixel of a region of interest, the value of this pixel by the sum of all of the values of the pixels of the regions of interest, application of a binarisation function, so that all of the pixels have the same weight. Among the binarisation functions, it is possible to use an Otsu, Bernsen, or Niblack fixed-threshold method.

Next, the expression "region of interest" and the expression "activity region" could be used interchangeably, since the regions of interest correspond to the regions in which PCR activity is likely.

In the case where a binarisation function is used, the regions of interest may be smoothed by applying one or more expansion, erosion or convex envelope application operation(s). The idea behind this smoothing is that the regions of interest correspond to a location where the PCR reaction took place, and are therefore normally closed.

For example, the expansion of the regions of interest may provide for the addition of a pixel around the boundary of each region until the sum of the total surfaces of the regions exceeds a selected threshold.

Still as example, the erosion may provide for the removal of the regions whose number of pixels is lower than a given threshold (for example 2).

Once the operation 240 is completed, the resulting PCR activity image is transmitted to the evaluator 8 which will combine it with the images of the film to return a detection result and/or a Ct. [FIG. 8] shows an example of an image obtained at the output of the operation 240. As one could see in this figure, the edges of the flat chamber delimit a corner.

As described hereinabove, the analyser 6 may also be implemented by means of an R-CNN mask (standing for "Region Based Convolutional Neural Networks"). This type of neural networks allows detecting regions in an image and carrying out the classification of the detected regions. The article by He et al. "Mask R-CNN", arXiv: 1703.06870, accessible at the address https://doi.org/10.48550/arXiv.1703.06870 describes how to implement them.

In the example described herein, the learning base consists of data derived from PCRs carried out on CHRONOS Dx machines from the company BforCure. In order to guarantee variability in the learning data, the machines are 20 in number. The learning and test data are separated according to the machines, so that the data of a machine used for learning are not used for the tests.

These data are annotated using dedicated software according to a semantic mask that uses one value per class considered for each pixel of the image. These data are pre-processed in order to be set in the format compatible with the learning algorithm of each network type.

Given the nature of the data, the RCNN mask network comprises a backbone corresponding to a Resnet-50 (cf. for example https://web.archive.org/web/20211227064145/https://iq.opengenus.org/resnet50-architecture/for a description of Restnet-50), whose inputs are the same as those of the U-Net network described hereinbelow, i.e. a stack of 20 images of different cycles. The only modification with respect to a conventional RCNN mask is that the input does not have 3 channels but 20. Hence, the network cannot be re-learnt from a pre-trained network. The learning is performed like in the article by He cited hereinabove.

A post-processing may be necessary at the network output, for example when some pixels are covered by several instances of objects or by none. For the pixels that are not covered by any instance of object, if the pixel is in the region of the flat chamber, it is assigned the class "inactive PCR region", and if the pixel is outside the region of the flat chamber, it is assigned the class "outside the flat chamber". As regards pixels covered by several instances of objects, they are assigned the class having the highest score.

In the same manner as in the reference article, we apply data augmentation methods: rotations, noise on the pixels and elastic deformations. In addition, since our input comprises 20 PCR cycles among forty (a value depending on the used reagent kits), we can augment our data by offsetting the cycles proposed as input during the learning.

In this case, the images of each film are supplied to the analyser 6 which returns the semantically classified regions.

Still alternatively, the analyser 6 could be implemented by means of a simplified U-Net type neural network. The article by Ronneberger et al. "U-Net: Convolutional Networks for Biomedical Image Segmentation", Medical Image Computing and Computer-Assisted Intervention (MICCAI) LNCS 9351, pages 234-241 (2015), Springer available at the address https://arxiv.org/pdf/1505.04597.pdf describes the implementation of this neural network type. In the present case, the Applicant has identified that it is relevant to use a 3-layer U-Net instead of the 5-layer network of the original model, with 20 input channels each corresponding to an image of a cycle distributed during the real-time PCR reaction from which the film is derived. The training of the U-Net network has been carried out with the images and the data derived from 1,000 real-time PCR reactions, 10% of which have been preserved for the completion of the tests. Like in the reference article cited hereinabove, it is advantageous to use data augmentation methods: rotations, noise on the pixels and elastic deformations. The re-balancing of the different considered classes is ensured by a weighting map which also takes account of the distance of the pixels to the boundary regions. [FIG. 10] shows an example of implementation of the architecture of the U-Net network described herein.

The output of the R-CNN mask and of the U-NET network is each time a list of semantically classified regions, with the likelihood density for the class "active PCR region".

[FIG. 3] shows an embodiment of a function implemented by the evaluator 8.

This function starts with a mixing operation 300 in which the images of the film and the PCR activity image determined by the evaluator 6 are combined. In the example described herein, the value of each pixel in each image of the film is weighted by the value of the pixel that corresponds thereto in the PCR activity image.

Afterwards, in an operation 320, the evaluator 8 applies an algorithm on the resulting images in each region of interest or in each pixel, in the same manner as is done for the entire image in the prior art The output of this algorithm may be a value indicating the detection or not of an amplification and/or a cycle index value starting from which the amplification is significant. Moreover, this algorithm is known. The output of this algorithm may also be the concentration curve shown on [FIG. 9]. In this figure, the continuous curve represents the concentration curve measured thanks to the device of the invention, whereas the dotted curve represents the concentration measured with the method of the prior art Hence, it is possible to obtain a value Ct for each region of interest, or for each pixel whose associated likelihood in the likelihood density of the PCR activity image is non-zero.

Optionally, the evaluator 8 may return a value Ct for the real-time PCR reaction from these local values Ct.

Thus, the value Ct may be calculated as $C_t = \log_2(S_t / \Sigma_i S_i x 2^{-Ct_i})$, where $S_t$ is the total surface area of the regions of interest (for examples in pixels), $S_i$ is the surface area of each region of interest (for example in pixels), and $Ct_i$ is the Ct value of the region of interest of index i. This approach may be pushed to the extreme by reducing each region of interest to one single pixel.

Since the concentration of nucleic acid sequence is sought twice at each cycle, the concentration of this sequence is therefore proportional to $2^{-Ct}$.

FIGS. 4 to 6 illustrate the images obtained by the implementation of the device 2 with an analyser 6 in accordance with that one described with the [FIG. 2], Thus, the PCR activity image is obtained as follows:

- for each cycle, determining a fluorescence image corresponding to the cold phase of the cycle. This image is obtained by averaging the images captured during this phase, drawn from the second half of the cycle,
- constructing the image of differences from an image of the maximum fluorescences of the last cycles, from which an image of the minimum fluorescences of the first cycles is subtracted. The cycles used for the calculation of this image are the cycles 5 to 15 for the minimum image and the cycles 26 to 45 for the maximum image,
- transforming the image of the differences into binary image by applying a fixed threshold of 2 fluorescence values with the application of an erosion, a convex envelope to "plug the holes", and an expansion until obtaining a total surface area of at least 1000 pixels,
- removing the regions of the image that do not correspond to the flat chamber with which the PCR is performed, and
- removing the regions that correspond to bubbles.

Thus, starting from [FIG. 6], which shows the averaged image for the cycle 41, an image of the differences shown in [FIG. 7] is obtained. Finally, the thresholding operation gives the image of [FIG. 8]. This image is combined with the images of the film to produce [FIG. 9], which shows a Cti at 35.6849, which gives a Ct of 38.363 by applying the formula set out before.

The invention claimed is:

1. A device for processing real-time PCR measurements with a homogeneous reaction medium in which the PCR reagents can diffuse, the device comprising:

a memory configured to receive a plurality of fluorescence images obtained by filming a real-time PCR reaction in a flat chamber, an analyzer configured to produce a PCR activity image from the plurality of fluorescence images with a homogeneous reaction medium in which the PCR reagents can diffuse, which PCR activity image has a plurality of activity regions in each of which PCR activity is determined as likely on the basis of the fluorescence value of the pixels of these activity regions in the plurality of fluorescence images, each of the pixels of the activity regions receiving a weighting value associated with the likelihood of a PCR reaction such that the sum of all weighting values is one, and the pixels outside the activity regions receiving a zero value, an evaluator configured to analyze the plurality of fluorescence images obtained by filming a real-time PCR reaction in a flat chamber by weighting in each image the fluorescence value of each pixel by the weighting value of that pixel in the activity image, and to return one or more among a value indicating whether the filmed real-time PCR reaction exhibits PCR amplification, a threshold cycle value, and a concentration curve during the PCR reaction.

2. The device according to claim 1, wherein the analyzer is configured to determine an image of differences from the plurality of fluorescence images, in which each pixel corresponds to the difference between the highest value and the lowest value for that pixel among the plurality of fluorescence images, and to determine the activity image from the difference image.

3. The device according to claim 2, wherein the analyzer is configured to determine activity regions in the image of the differences by thresholding the image of the differences.

4. The device according to claim 2, wherein the analyzer is configured to determine a unique weighting value for each of the pixels of the PCR activity image.

5. The device according to claim 4, wherein the analyzer is configured to determine the weighting value by applying an Otsu, Bernsen, or Niblack fixed-threshold binarization function.

6. The device according to claim 4, wherein the analyzer is configured to apply a binarization function comprising regularising the activity regions by applying expansion, erosion, or convex envelopes.

7. The device according to claim 6, wherein the analyzer is configured to apply a binarization function in which the expansion of the activity regions is obtained by adding a pixel around each area activity region until the sum of the surface areas of the activity regions exceeds a selected threshold, or to apply a binarization function in which erosion of the activity regions comprises removing the activity regions whose number of pixels is lower than a selected threshold.

8. The device according to claim 2, wherein the analyzer is configured to determine the weighting value by dividing the value of each pixel belonging to an activity region by the sum of all pixel values of all activity regions.

9. The device according to claim 1, wherein the analyzer is an R-CNN mask type or U-Net type neural network carrying out a semantic segmentation of the pixels from the plurality of fluorescence images.

10. The device according to claim 1, wherein the evaluator is configured to determine a threshold cycle value for each activity regio, and to calculate a threshold cycle value according to the formula $C_t = \log_2(S_t/\Sigma_i S_i x 2^{-Ct_i})$, where $S_t$ is the total surface area of the activity regions, $S_i$ is the surface area of each activity region, and $Ct_i$ is the threshold cycle value of the activity region of index i.

11. A method for processing real-time PCR measurements with a homogeneous reaction medium in which the PCR reagents can diffuse, the method comprising:

a) receiving a plurality of fluorescence images obtained by filming a real-time PCR reaction in a flat chamber with a homogeneous reaction medium in which the PCR reagents can diffuse, b) producing a PCR activity image from the plurality of fluorescence images, which PCR activity image has a plurality of activity regions in each of which PCR activity is determined to be likely on the basis of the fluorescence value of the pixels of these activity regions in the plurality of fluorescence images, each of the pixels of the activity regions receiving a weighting value associated with the likelihood of a PCR reaction such that the sum of all values is one, and the pixels outside the activity regions receiving a zero value, c) analyzing the plurality of fluorescence images by weighting in each image the fluorescence value of each pixel by the weighting value of that pixel in the activity image, and to return one or more among a value indicating whether the filmed real-time PCR reaction exhibits PCR amplification, a threshold cycle value, and a concentration curve during the PCR reaction.

12. The method according to claim 11, wherein the operation b) comprises:

b1) determining an image of differences from the plurality of fluorescence images, in which each pixel corresponds to the difference between the highest value and the lowest value for that pixel among the plurality of fluorescence images, and b2) determining the activity image from the difference image.

13. The method according to claim 12, wherein the operation b) comprises determining a unique weighting value for each of the pixels of the PCR activity image, or determining the weighting value by dividing the value of each pixel belonging to an activity region by the sum of all pixel values of all activity regions.

14. The method according to claim 11, wherein the operation b) is obtained by applying a R-CNN mask type or U-Net type neural network carrying out a semantic segmentation of the pixels from at least some of the images of the operation a).

15. The method according to claim 11, wherein the operation c) comprises determining a threshold cycle value for each activity region, and calculating a threshold cycle value according to the formula $C_t = \log_2(S_t/\Sigma_i S_i x 2^{-Ct_i})$, where $S_t$ is the total surface area of the activity regions, $S_i$ is the surface area of each activity region, and $Ct_i$ is the threshold cycle value of the activity region of index i.

16. A non-transitory computer readable storage medium storing instructions that, when executed by a computer, cause the computer to perform the method according to claim 11.

* * * * *